United States Patent [19]

Rochau

[11] Patent Number: 4,723,865

[45] Date of Patent: Feb. 9, 1988

[54] CLAMP WITH SUPPORT MEMBER

[76] Inventor: Gerhard Rochau, Morikestrasse 27, 7067 Pluderhausen, Fed. Rep. of Germany

[21] Appl. No.: 890,527

[22] Filed: Jul. 29, 1986

[30] Foreign Application Priority Data

Jul. 30, 1985 [DE] Fed. Rep. of Germany ....... 3527238

[51] Int. Cl.[4] .................................................. F16B 7/04
[52] U.S. Cl. .................................. 403/385; 403/389
[58] Field of Search ............. 403/389, 390, 391, 385, 403/387, 405.1; 411/432, 84, 85, 112; 211/189, 183

[56] References Cited

U.S. PATENT DOCUMENTS

| | | | |
|---|---|---|---|
| 2,495,116 | 6/1950 | McClain | 403/220 X |
| 2,717,622 | 9/1955 | Flora | 411/112 |
| 2,833,608 | 5/1958 | Tobias . | |
| 3,011,235 | 12/1961 | Pacheco | 403/391 X |
| 4,227,594 | 10/1980 | Kluger | 403/406.1 X |
| 4,278,361 | 7/1981 | Steinke | 403/344 X |
| 4,368,998 | 1/1983 | Pestoor | 403/406.1 X |
| 4,408,928 | 10/1983 | Steinke | 403/405.1 |

FOREIGN PATENT DOCUMENTS

| | | |
|---|---|---|
| 1961807 | 6/1967 | Fed. Rep. of Germany . |
| 2147065 | 3/1973 | Fed. Rep. of Germany . |
| 2412086 | 6/1975 | Fed. Rep. of Germany . |
| 2144914 | 2/1973 | France . |
| 158808 | 6/1981 | German Democratic Rep. . |
| 1218264 | 1/1971 | United Kingdom ................ 411/112 |

OTHER PUBLICATIONS

DE-Z Maschinenmarkt, No. 39, May 14, 1963, pp. 30-33.

Primary Examiner—Randolph A. Reese
Assistant Examiner—Peter M. Cuomo
Attorney, Agent, or Firm—Roylance, Abrams, Berdo & Goodman

[57] ABSTRACT

A clamp has a support member having a plurality of walls with at least two walls oriented at an angle to each other. Passages are provided in the walls with at least one passage being internally threaded. One wall is provided with at least one recess each its opposite edges.

18 Claims, 8 Drawing Figures

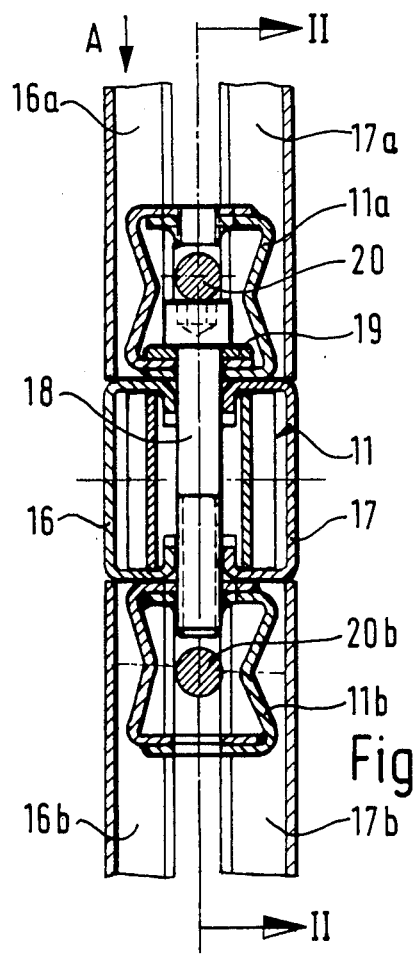
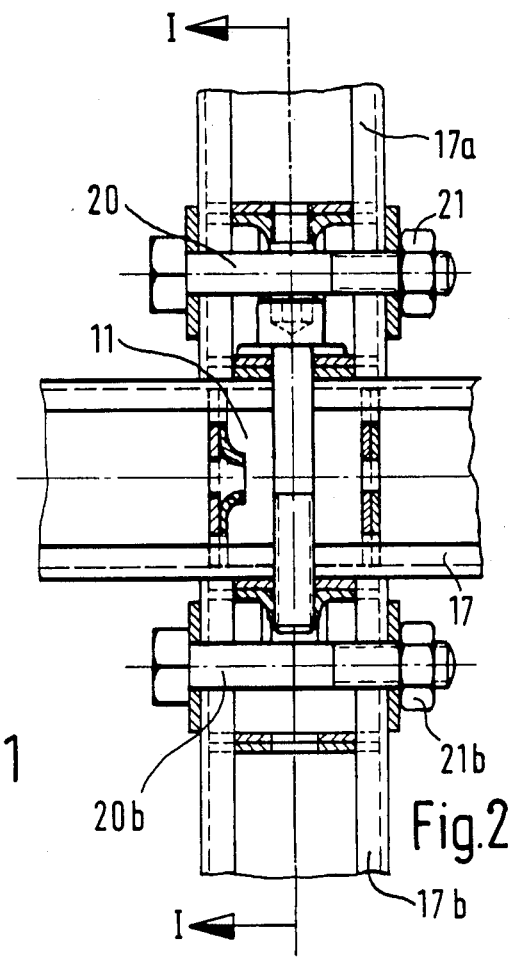
Fig.1
Fig.2
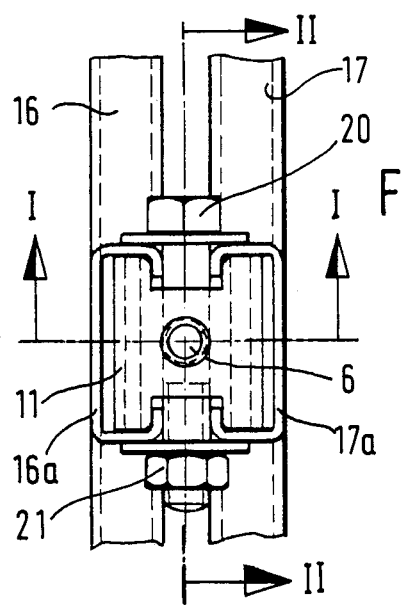
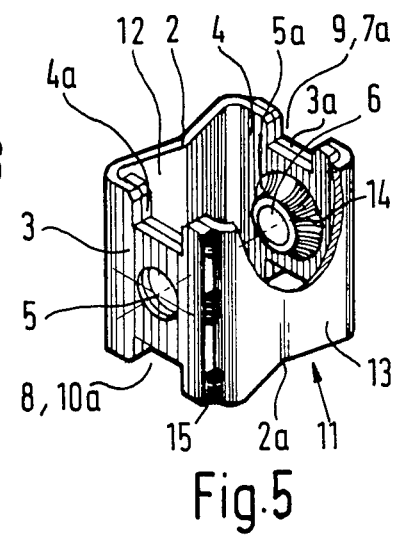
Fig.3
Fig.5

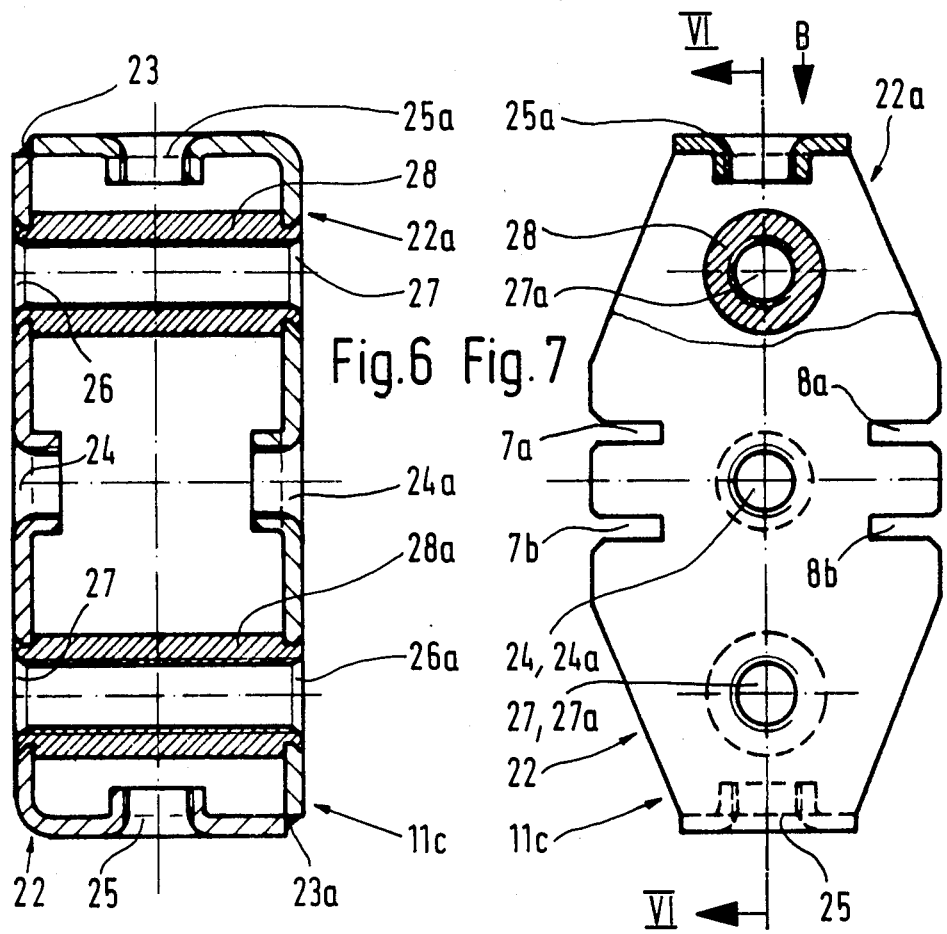
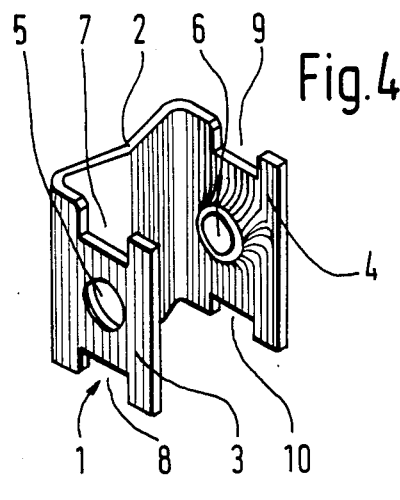
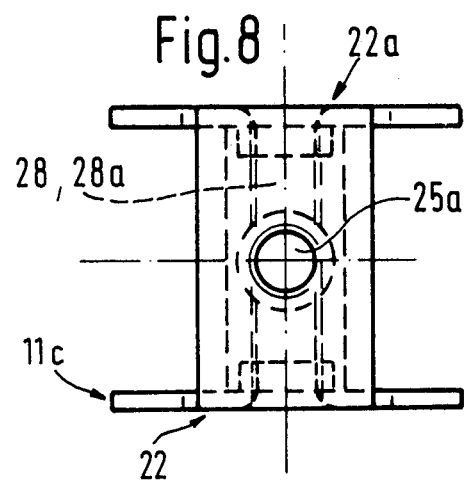

CLAMP WITH SUPPORT MEMBER

FIELD OF THE INVENTION

The present invention relates to a clamp with a support member, particularly for coupling a plurality of C-shaped bars.

SUMMARY OF THE INVENTION

An object of the present invention is to provide a a clamp of manifold uses which is easy to manufacture.

The foregoing object is obtained by a clamp comprising a plurality of walls with at least two of the walls being oriented at an angle to each other. Passages extend through two of the walls, with one passage being internally threaded. Recesses are provided on opposite edges of at least one of the walls.

The support member can receive insertions on various sides. The recesses in the support member can hold a single engagement member, e.g., C-shaped bar. Two parallel contact members can also be engaged by the recesses.

To simplify the configuration of the support member, the support member can be formed of sheet metal with walls of equal thickness.

One wall can be bent inwardly forming a rib to prevent bending in of the arms of a C-shaped bar under a load applied perpendicular to the arms.

Preferably the support member is generally rectangular in profile.

The manufacture of the support member is simplified by the support member being essentially closed laterally by its walls, but open on its two axial sides.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 1 is a side elevational view in section of a clamp arrangement according to a first embodiment of the present invention taken along lines I—I of FIGS. 2 and 3;

FIG. 2 is a front elevational view in section taken along lines II—II of FIG. 1;

FIG. 3 is a top plan view of the clamp arrangement of FIG. 1;

FIG. 4 is a perspective view of a single support member part of the clamp arrangement of FIG. 1;

FIG. 5 is a perspective view of a support member of the clamp arrangement of FIG. 1;

FIG. 6 is a front elevational view in section of a support member according to a second embodiment of the present convention, taken along lines VI—VI of FIG. 7;

FIG. 7 is a side elevational view in partial section of the support member of FIG. 6; and FIG. 8 is a top plan view of the support member of FIG. 6 viewed in the direction of arrow B of FIG. 7.

DETAILED DESCRIPTION OF PREFERRED EMBODIMENTS

Referring initially to FIG. 4, a support member part 1 is configured as a U-shaped sheet metal part with essentially uniform wall thickness. Support member part 1 has a middle wall 2 bent inwardly towards its legs or end walls 3 and 4. On each side of middle wall 2, a leg 3 or 4 is attached. The legs have passages 5 and 6. The edge of passage 6 extends inwardly and is provided with internal threads. Recesses 7 and 8 are provided on the top and bottom edges of leg 3. On leg 4, recesses 9 and 10 are provided on its top and bottom edges. The corners of support member part 1 are rounded or beveled.

Middle wall 2 of support member 1, especially in its middle, can likewise have a passage and is bent inwardly toward legs 3 and 4, especially with flat sides oriented to form a channel and provide a rib. The middle of the rib extends parallel to the corners formed by the connections of wall 2 to walls 3 and 4.

In FIG. 5, support member 11 has two support members parts 12 and 13 inserted into one another. Each part is configured corresponding to support member part 1, except that only support member part 13 is provided with a passage 6 having an inwardly projecting edge and an internal thread. The inwardly projecting portion 14 defining passage 6 projects through a passage 5a in support member part 12. Support member parts 12 and 13 are connected together so that the respective legs engage on each other and the bent-in middle walls are superposed over each other. Support member parts 12 and 13 are connected with each other by two weld connections. Weld connection 15 comprises three weld points.

As illustrated in FIGS. 1-3, support member 11 connects two C-shaped bars 16 and 17. The bar edges engage and extend into recesses 7, 8 and 9, 10, opposite each other in one support member part 12 in this support member, and in corresponding recesses in another support member 11. The arms of bars 16 and 17 are supported by bent middle walls 2, walls 2a of support member 11.

With a screw 18 oriented perpendicular to the axis of passages 5 and 6 of support member 11 and arranged between bars 16 and 17, the facing sides of bars 16 and 17 can each be fastened to a support member 11a or 11b of the same configuration of support member 11. Screw 18 extends through passage 5 of support member 11a. A base plate 19 lies under the screw head of screw 18 such that two legs 3 and 4a of support member 11 are pressed against support member 11b. Screw 18 has its end, opposite the screw head, threaded in passage 6 of support member 11.

With use of a screw 20 arranged perpendicular to screw 18, two C-shaped bars 16a and 17a of the same configuration as bars 16 and 17 can be fastened on support member 11. Between the head of screw 20 and nut 21 threaded onto screw 20, a base plate bridges over each of the clearances between the two bars 16a and 17a.

With use of support member 11b, bars 16b and 17b are fastened by a screw 20b passing through support member 11b, in the same manner bars 16a and 17a are fastened to support member 11a. By using support members 11, 11a and 11b to couple bars 16, 17, 16a, 17a, 16b and 17b, a flat intersecting connection or clamp arrangement is obtained.

It is also possible, on the walls of the C-shaped bars 16 and 17 of FIG. 1 between the arms in the viewing plane, to apply a pair of additional bars on each side. On each side of bars 16 and 17, a support member, corresponding to a support member 11, is fastened by a screw, between support member 11 and bars 16 and 17. The shaft of the screw holds the support member and projects outward.

The screw can be threaded into passage 6 of the relevant support member. This screw can also pass through its passage 5. If a nut is threaded onto this screw, support member part 13 is fastened to bar 16 or 17 with this nut. A corresponding coupling is possible with a support member having passages configured without threads.

Support members, corresponding to the support members arranged on both sides of bars 16 and 17, as shown for the combination with support members 11a and 11b, can be fastened by screws to secure other C-shaped bars corresponding to bars 16 and 17. In this manner, a three-dimensional intersection is obtained.

Referring now to FIGS. 6-8, a support member 11c can be used for connecting two C-shaped bars with rather long arms. Support member 11c is formed of two L-shaped support members parts 22 and 22a, connected at their ends by a weld seam 23 or 23a. Each support member part has a passage 24, 25 or 24a, 25a with internal threads in each of its two arms. The passages are defined by inwardly projecting central portions of each arm. On its longer arms, each part has passages 26, 27 or 26a, 27a, on both sides of the passage 24 or 24a. An internally threaded bushing 28 or 28a is arranged between each set of passages 26, 27a or 26a, 27. The bushings serve as spacers. The ends of each bushing are connected tightly by means of flange connections with the edges of passages 26, 27 or 26a, 27a.

FIG. 7 shows the longer arm of support member parts 22 and 22b in the area of passages 24 and 24a where they are broadest. The longer arms taper, wedge-like, outwardly in the direction of passages 25 and 25a.

Instead of one single recesses, as in support member 1, two recesses 7a and 7b or 8a and 8b are provided on opposite sides of the long arms of support member 11c.

Also, C-shaped bars can be combined in pairs, corresponding to FIGS. 1 to 3, to form a T-shaped, flat or three-dimensional intersecting structure with the aid of support members 11c.

Recesses 7 to 10 in the embodiment of FIGS. 4 and 5 and recesses 7a, 7b, 8a and 8b in the embodiments of Figures 6 to 8 are configured with straight sides, since the edges of the C-bars extend in a straight line in cross-section along the edges turned toward each other, i.e., parallel to the middle part. However, if C-shaped bars have edges turned toward each other extending obliquely or are bent, i.e., are not parallel to their middle parts, the sides of the recesses are adapted to the edges of the bars.

For bent or oblique edges of the C-bars extending outwardly from both sides, wedges turned toward each other are held tightly together by a screw. In comparison with FIGS. 1 to 3, the base plates associated with screw 20 are each replaced by one wedge. Each wedge engages between the edges of two adjacent bars 16a and 17a and does not project over the bars. Nut 21 can be deleted by providing threads in one of the wedges. If the screw head is lowered, an overlap of the screw on both sides of the wedges and over the bars can be avoided.

While various embodiments have been chosen to illustrate the invention, it will be understood by those skilled in the art that various changes and modifications can be made therein without departing from the scope of the invention as defined in the appended claims.

What is claimed is:

1. A clamp, comprising:
    a support member having at least three walls, at least two of said walls being oriented at an angle to each other, one of said walls being bent inwardly forming a rib extending parallel to corners formed between said one wall and two adjacent walls;
    first and second passages through two of said walls, respectively, at least one of said passages being internally threaded; and
    first and second recesses on opposite edges of one of said walls.

2. A clamp according to claim 1 wherein said support member is formed of sheet metal, said walls being of uniform thickness.

3. A clamp according to claim 1 wherein said support member is generally rectangular in transverse cross section.

4. A clamp according to claim 3 wherein said support member comprises first and second parts with open sides facing each other, one of said parts including the wall with the internally threaded passage.

5. A clamp according to claim 4 wherein said first and second parts are coupled by a weld connection.

6. A clamp according to claim 4 wherein said first and second parts have a central passageway.

7. A clamp according to claim 1 wherein said support member comprises a central passageway.

8. A clamp according to claim 4 wherein each of said parts is U-shaped in transverse cross section.

9. A clamp according to claim 1 wherein a screw passes through said support member, said screw bearing on a pair of base parts having respective passages and fastening two C-shaped bars to said support member.

10. A clamp according to claim 9 wherein said base parts are wedge shaped, one of said passages in one of said base parts being threaded, the other of said base parts having a recesses on a wider end thereof receiving a head of said screw.

11. A clamp, comprising:
    a support member having at least three walls, at least two of said walls being oriented at an angle to each other;
    first and second passages through two of said walls, respectively, at least one of said passages being internally threaded;
    first and second recesses on opposite edges of one of said walls; and
    a screw passing through said support member, said screw bearing on a pair of base parts having respective passages and fastening two C-shaped bars to said support member.

12. A clamp according to claim 11 wherein said base parts are wedge shaped, one of said passages in one of said base parts being threaded, the other of said base parts having a recesses on a wider end thereof receiving a head of said screw.

13. A clamp for connecting two C-shaped profiled bars, comprising:
    a first rectangular hollow support member having a plurality of walls, generally right angles between adjacent walls, two facing open sides and first and second passages in two opposite walls, said support member being formed of substantially identical first and second parts coupled to each other with open sides thereof facing each other;
    first and second recesses in each of two opposite walls for receiving portions of the profiled bars; and
    screw means for attaching the two profiled bars to said support member, said screw means extending through a central passageway of said support member and between the two profiled bars when the profiled bars are received in said recesses.

14. A clamp according to claim 13 wherein one of said walls is bent inwardly forming a rib extending parallel to corners formed between said one wall and two adjacent walls.

15. A clamp according to claim 13 wherein each of said parts is L-shaped in transverse cross section.

16. A clamp according to claim 13 wherein each of said parts is U-shaped in transverse cross section.

17. A clamp according to claim 13 wherein said support member has third and fourth coaxial passages along an axis perpendicular to an axis through said first and second passages, at least one of said passages having threads.

18. A clamp according to claim 13 wherein a second support member connects two additional profiled bars with the two C-shaped profiled bars connected by said first support member, said second support member being connected by a screw to said first support member, said screw passing through a central passageway of said first support member.

* * * * *